United States Patent
Brown et al.

(10) Patent No.: US 7,618,471 B2
(45) Date of Patent: Nov. 17, 2009

(54) METHOD AND APPARATUS FOR SEPARATING LIQUID DROPLETS FROM A FLUID FLOW STREAM

(75) Inventors: William Brown, Berlin, MA (US); Peter Rezac, Hudson, MA (US); William Skrivan, Boston, MA (US); Oren Bernstein, Swampscott, MA (US)

(73) Assignee: Protonex Technology Corporation, Southborough, MA (US)

( * ) Notice: Subject to any disclaimer, the term of this patent is extended or adjusted under 35 U.S.C. 154(b) by 420 days.

(21) Appl. No.: 11/452,451

(22) Filed: Jun. 13, 2006

(65) Prior Publication Data

US 2007/0287052 A1     Dec. 13, 2007

(51) Int. Cl.
*B01D 46/18* (2006.01)
(52) U.S. Cl. .............................. 55/406; 55/400; 55/407; 55/408; 95/35; 95/270; 429/12; 34/58; 34/59; 34/318
(58) Field of Classification Search .................... 55/406, 55/407, 408, 400; 95/31, 34, 35, 270; 429/12–46; 34/318–324, 58–59
See application file for complete search history.

(56) References Cited

U.S. PATENT DOCUMENTS

| | | | | |
|---|---|---|---|---|
| 3,915,673 A | * | 10/1975 | Tamai et al. | ............. 95/35 |
| 3,998,610 A | * | 12/1976 | Leith | .............................. 95/35 |
| 4,278,450 A | * | 7/1981 | Hurst et al. | ................... 95/270 |
| 4,361,490 A | | 11/1982 | Saget | |
| 4,491,624 A | * | 1/1985 | Sarbacher et al. | ............. 429/27 |
| 5,064,732 A | | 11/1991 | Meyer | |
| 5,792,363 A | | 8/1998 | Rodgers | |
| 6,190,438 B1 | | 2/2001 | Parks | |
| 6,436,562 B1 | | 8/2002 | DuBose | |
| 6,436,563 B1 | | 8/2002 | Frank et al. | |
| 6,447,945 B1 | | 9/2002 | Streckert | |
| 6,869,469 B2 | * | 3/2005 | Grover et al. | ................. 96/417 |
| 6,893,754 B2 | | 5/2005 | Agar et al. | |
| 6,921,601 B2 | | 7/2005 | Senner et al. | |
| 6,932,847 B2 | | 8/2005 | Amendola et al. | |
| 6,950,729 B2 | | 9/2005 | Mitchell et al. | |
| 2003/0190513 A1 | * | 10/2003 | Meissner et al. | ............. 429/26 |

* cited by examiner

*Primary Examiner*—Robert J Hill, Jr.
*Assistant Examiner*—Dung Bui
(74) *Attorney, Agent, or Firm*—Christine C. O'Day; George N. Chaclas; Edwards Angell Palmer & Dodge LLP (57) ABSTRACT

A device for recovering liquid droplets from a fluid flow stream including a rotatable element comprising wall elements configured to partially enclose a volume with an annular perimeter wall that includes an inside surface radially offset from and facing an axial center, a fixed base wall supports the rotatable element about the axial center, an input fluid conduit delivers the fluid flow stream into the fluid volume, means for rotating the rotatable element for generating a centrifugal force capable of forming a layer of liquid held by the centrifugal force against the inside surface, and an output liquid conduit disposed to collect liquid from the layer of liquid, wherein the layer of liquid rotates with the inside surface with a tangential velocity vector and the collection aperture is fixed in position opposed to the tangential velocity vector such that liquid in the layer of liquid enters the collection aperture.

27 Claims, 6 Drawing Sheets

METHOD AND APPARATUS FOR SEPARATING LIQUID DROPLETS FROM A FLUID FLOW STREAM

BACKGROUND OF THE INVENTION

1. Field of the Invention

The present invention relates to an apparatus for separating liquid droplets from a fluid flow containing the liquid droplets entrained therein. In particular, the invention relates to separating liquid droplets from a fluid flow by directing the fluid flow onto a rotating element, gathering the liquid droplets at a radial perimeter of the rotating element and collecting the liquid droplets therefrom.

2. Description of Related Art

Various devices are known for separating liquid droplets from a fluid flow. A fluid mixture may be generated that includes various components in a plurality of states, e.g. gases, vapors, liquids, liquid droplets and solid particles. Devices are known for separated or filtering fluid mixtures to remove a component from the main fluid flow. It is known to separate liquid droplets from a predominantly gaseous fluid flow by causing the fluid flow to rotate. By generating a rotation within the fluid flow, e.g. causing the fluid to rotate about the longitudinal axis of a cylindrical fluid conduit, a centrifugal force generated within the fluid flow causes liquid droplets to move toward a radial perimeter of the fluid conduit. The fluid flow is then divided by dividing the fluid conduit into a center portion, which receives a predominately gaseous component of the fluid flow, and a radial perimeter portion which receives the majority of the liquid droplets contained within the fluid flow. Accordingly, liquid droplets are removed from the main fluid flow, which continues to flow through the center portion. Examples of devices that utilize centrifugal force to separate liquid droplets from a fluid flow are disclosed in U.S. Pat. No. 6,190,438, by Rodgers et al., in U.S. Pat. No. 6,190,438, by Parks, and in U.S. Pat. No. 4,361,490, by Saget. While the above listed patent disclosures provide useful teachings for utilizing a centrifugal force to separate liquid droplets from a fluid flow, they do not provide a suitable solution to the problem of gathering the liquid droplets together and collecting the gathered liquid droplets for reuse. There is a need in the art, and especially in the art of fuel cells, to separate liquid droplets from a fluid flow, and a further need to collect the liquid droplets for reuse.

Fuel cell systems provide a portable and convenient way to generate electrical current by reacting chemical compounds, or reactants, in such a way a chemical reaction frees electrons for generating an electrical current that is usable for powering electronic devices. Generally, a fuel cell system includes one or more reactant source containers capable of delivering a continuous supply of each reactant to a fuel cell element. In some cases a reactant may comprise air or water which may be readily available from outside the fuel cell system. In any event, reactants may comprise liquids, solids, gases or a mixture thereof.

Generally, reactants are combined within a fuel cell element to generate an electrical current. A byproduct outflow is also produced. The byproduct outflow may comprise unused reactants plus other compounds and or solutions produced by the chemical reaction used to generate electrical current. Accordingly, the byproduct outflow may comprise liquids, solids, gases or a mixture thereof. There is a need in the fuel cell art to separate a byproduct outflow into component parts and to recover compounds and or elements from the byproduct that may be useful. Alternately hazardous compounds and or elements may need to be separated from the byproduct for proper handling. In particular, separating liquids from the outflow of a fuel cell is an important aspect of developing fuel cells, and especially separating liquid water from the byproduct outflow. In many fuel cell devices, a supply of liquid water is needed for various reasons, e.g. to hydrate an electrolyte (e.g., a solid polymer electrolyte), to dilute a reactant (e.g., to reduce reactant crossover), or for use in hydrogen gas production such as by reformation, or hydrolysis of a chemical hydride. In an effort to decrease the overall volume and weight of a fuel cell system, it is advantageous to separate liquid water from the byproduct outflow and to recycle it. In other instances, liquid water generated by a fuel cell must be collected and properly stored in order to avoid damage to the local environment of the fuel cell.

Water recycling schemes for fuel cell systems are disclosed in numerous U.S. patents including U.S. Pat. No. 6,436,562 by DuBose, U.S. Pat. No. 6,436,563 by Frank et al., U.S. Pat. No. 6,921,601 by Senner et al., U.S. Pat. No. 6,893,754 by Agar et al., U.S. Pat. No. 6,950,729 by Michell et al., U.S. Pat. No. 6,447,945 by Streckert et al., and U.S. Pat. No. 5,064,732 by Meyer. These patents collectively disclose various device and process elements used to separate liquid water from the outflow of a fuel cell. However, the prior art water recovery systems are complex and add undesired weight, volume and cost to the fuel cell system. Moreover, most of the water managements systems disclosed in the prior art utilize electrical pumps and or motors to manage the liquid water and these electrical devices reduce the overall efficiency of the fuel cell system.

Accordingly, there is a need in the fuel cell art for a simple device for separating liquid droplets, especially water, from the byproduct outflow and for collecting the liquid droplets. Moreover, there is a need in the fuel cell art to reduce the volume, weight, cost and electrical energy consumption of liquid and or water management systems. There is a still further need in the fuel cell art for a liquid and or water management systems that can operate in al possible orientations without degrading the performance of the fuel cell system.

BRIEF SUMMARY OF THE INVENTION

The problems of the prior art are overcome by providing a novel device (150, 250) for recovering liquid droplets from a fluid flow stream containing the liquid droplets entrained therein. The device includes a rotatable element (164, 256) formed to surround a partially enclosed fluid volume (184, 262). The fluid volume (184, 262) is bounded by an annular perimeter wall (170, 268) having a longitudinal length and a substantially uniform radius with respect to an axial center or rotation axis (176, 272). The fluid volume (184, 262) may be further bounded at a bottom end by a circular base wall (168, 264) and at a top end by a circular top wall (186, 270) that includes a top aperture (182, 270) formed therethrough for providing access into the fluid volume (184, 262). The annular perimeter wall (170, 268) includes an annular inside surface (172, 284) that extends generally longitudinally along and radially offset from the axial center (176, 272) and is generally orthogonal with the base wall (166, 264) and the top wall. The rotatable element (164, 256) is rotatably supported on a fixed base wall (158, 257) for rotation about the axial center (176,272). The fixed base element (158, 257) may further comprise wall elements attached thereto and formed to enclose the rotatable element within a fluid volume (156, 254). An input fluid conduit (196, 278) includes an exit aperture (202, 282) formed in an output end thereof and the output end is fixedly disposed to deliver the fluid flow stream into the partially enclosed fluid volume (184, 262) and to deposit liquid droplets onto inside surfaces of the rotatable element. The rotatable element (164, 256) is rotated about the axial center (176, 272) with sufficient angular velocity for generating a centrifugal force capable of moving liquid droplets deposited onto the inside surfaces (168, 172, 284) of the partially enclosed fluid volume (184, 262) and to form and hold a layer of liquid against the inside surface (172, 284). In the device 150, the inside surface 172 may be contoured with a v-shaped liquid holding trough formed with a maximum diameter (174). An output liquid conduit (208, 288) is formed with a collection aperture (212, 290) at an input end thereof and disposed in a fixed position to position the collection aperture proximate to the inside surface (172, 284) for collecting liquid from the layer of liquid held against the inside surface (172, 284). In a preferred embodiment, the collection aperture (212, 290) is directed opposed to the tangential velocity of the liquid layer. If a pump is used to suction liquid from the liquid layer, other collection aperture orientation are usable.

In a first embodiment of the invention, the rotatable element (164) is rotated by a rotary motor (192) supported by the fixed base wall (158). In a second embodiment of the invention, the rotatable element (256) is configured with a plurality of impeller blades (276) disposed inside the partially enclosed fluid volume (262), equally spaced apart and shaped to receive a fluid flow thereon and to generate a tangential force in response to receiving the fluid flow directed thereon. Each impeller blade is attached to the perimeter wall 268 and may also attach to the base wall (264). Fluid exiting from the input aperture (282) is directed onto the impeller blades (276) and impinges upon each impeller blade in a manner suitable for generating a tangential force on the rotatable element (256) and causing the rotating element (256) to rotate about the axial center (272) in response to the action of the fluid impinging onto the impeller blades (276).

BRIEF DESCRIPTION OF THE DRAWINGS

The features of the present invention will best be understood from a detailed description of the invention and a preferred embodiment thereof selected for the purposes of illustration and shown in the accompanying drawing in which.

DETAILED DESCRIPTION OF THE INVENTION

Figure 1:
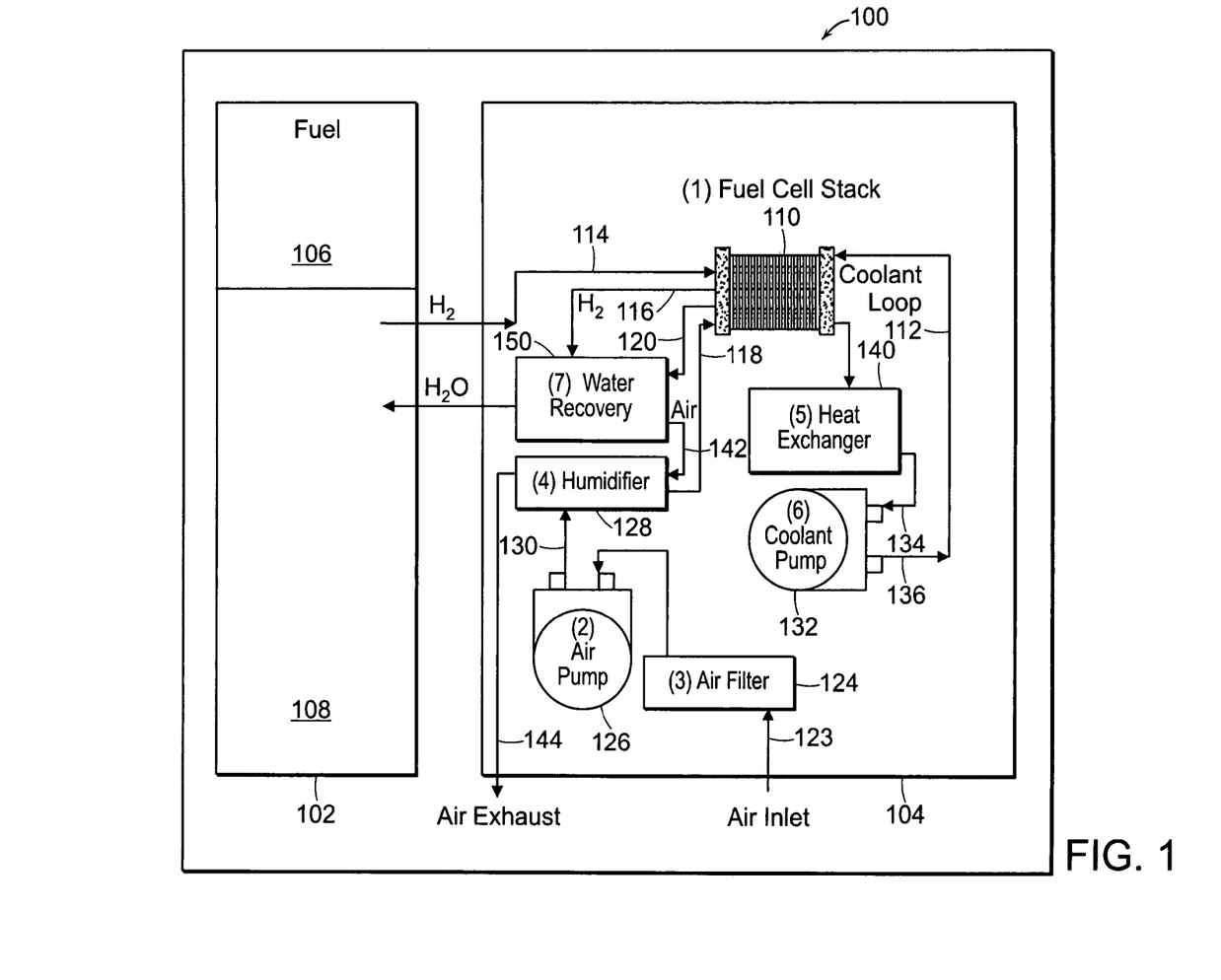
FIG. 1 depicts a schematic representation of an example fuel system including a device for separating liquid droplets from a fluid flow according to the present invention.

Referring to FIG. 1, an example hydrogen polymer electrolyte, (PEM), fuel cell system 100 is shown schematically. The fuel cell system 100 comprises a fuel supply element 102 and a power generating element 104. In a preferred embodiment, the fuel cell system 100 may be configurable to deliver from 0.20 watts up to 20 kilowatts of continuous power. Moreover, the fuel cell system is preferably portable with a weight ranging from 20-20,000 grams depending on configuration. Preferably, the fuel supply element 102 comprises a removable fuel cartridge configured to store a compact fuel source and to a deliver a continuous supply of fuel to the power generating element 104. In a preferred embodiment, the fuel cartridge contains an aqueous solution of sodium borohydride, which when reacted with a catalyst generates gaseous hydrogen. Alternately, the fuel supply element 102 may contain any of a number of known chemical or metal hydrides for generating gaseous hydrogen. Similarly, the fuel supply element 102 may be configured to generate gaseous hydrogen by a reformation process, by hydrolysis of a hydride, by electrolysis of water or by any other process for generating gaseous hydrogen. Moreover, the fuel cartridge may include a pressurized gas bottle filled with gaseous hydrogen.

The example fuel supply element 102 includes an upper portion 106 for storing the fuel component and a lower portion 108 for storing a catalyst usable to release gaseous hydrogen fuel from the fuel component. The fuel supply element 102 is configured to mix the fuel component from the upper portion 106 with the catalyst stored in the lower portion 108 and to deliver a continuous supply of gaseous hydrogen out from the fuel supply element 102 and into the power generating element 104. In addition, the lower portion 108 is usable to store spent fuel component. In the present example, it is desirable to use liquid water to dilute or react with the fuel component. As will be detailed below, liquid water is collected from an outflow of the power generating element 104 and delivered into the fuel supply element 102 for use therein. One example of fuel supply element suitable for use with the present invention is disclosed by Amendola et al. in U.S. Pat. No. 6,932,847 which is incorporated herein by reference. More generally, the fuel supply element 102 may be configured to deliver any type of fuel usable for electrical power generation to the power generating element 104 and to receive any liquid collected from the outflow of the power generating element 104 and to store or otherwise utilize the collected liquid therein.

The fuel cell system 100 is configured with a frame or housing element, not shown, surrounding the working elements to protect and support the fuel cell system elements and the entire fuel cell system 100 may be configured for installing within a device as the device power supply. The frame or housing may be configured to receive and support one or more fuel cartridges 102 in a removable or a fixed configuration. The power generating element 104 includes the fuel cell element 110 and balance-of-plant components configured to support the generation of electrical power by the fuel cell element 110. Fuels or chemical reactants are input into the fuel cell element 110 and reacted therein. The resulting chemical reaction generates an electrical current, thermal energy, and an outflow that includes unused reactants, (fuels) and one or more reaction byproducts. The electrical current is drawn from the fuel element 110 and provides a useful power source. If required by the particular fuel cell system 100, a cooling loop 112 is provided to cool the fuel cell element 110. The outflow generated by the fuel cell element 110 may be discarded, stored, or processed to separate and reuse useful components contained therein. The present invention relates to separating and removing a liquid component from the fuel cell outflow, and especially to separating and removing liquid water, from the outflow.

The hydrogen fuel cell 110 combines gaseous hydrogen and gaseous oxygen to produce the electrochemical anode-cathode reaction detailed below.

Anode Reaction: $H_2 \rightarrow 2H^+ + 2e^-$

Cathode Reaction: $\frac{1}{2}O_2 + 2H^+ + 2e^- \rightarrow 2H_2O$

Net: $\frac{1}{2}O_2 + H_2 \rightarrow H_2O$

A supply of hydrogen gas received from the fuel supply element 102 is delivered to the fuel cell element 110 through a hydrogen input conduit 114. The hydrogen input conduit 114 delivers the hydrogen gas at a pressure and flow volume suitable for continuous power generation. Moreover, the input conduit 114 may include a regulating device, not shown, for adjusting the volume and or pressure of the gas inflow as may be required to adjust the rate of power generation. Hydrogen fuel passes through the fuel cell element 110, which is configured with a hydrogen flow path. Unused hydrogen exits from the fuel cell element 110 through a hydrogen outflow conduit 116. The hydrogen outflow conduit 116 may include a regulating device, not shown, for regulating the hydrogen outflow and or for regulating the back pressure of the hydrogen flow path. Oxygen, in the form of locally available air, is delivered into the fuel cell element 110 through an oxygen input conduit 118. Oxygen passes through the fuel cell element 110, which is configured with an oxygen flow path. Unused oxygen exits from the fuel cell element 110 through an oxygen or air outflow conduit 120. Reactant byproduct, in this case water, in the form of liquid water droplets and water vapor, is entrained within the hydrogen and oxygen flowing out of the fuel cell element 110 in the outflow conduits 116 and 120 with most of the liquid water being entrained within the oxygen outflow carried by conduit 120. In various embodiments according to the present invention, shown in FIGS. 2-5, outflow conduits deliver outflow from the fuel cell element 110 to a liquid recovery device 150, detailed below, which separates and recovers liquid water form the outflow.

An air intake system includes an air intake aperture 122 and an intake conduit 123. Air is drawn into the fuel cell system 100 through the intake aperture 122 which passed through a side wall of the fuel cell system frame or housing. An air filter 124 installs in the air intake conduit 123 and removes contaminates from the air flowing therethrough. An air pump 126 includes an intake side configured to draw air into the fuel cell system through the air conduit 123 and air filter 124. The pump includes an air outflow side configured to force air through an air humidifier 128 and into the fuel cell element 110 through the air or oxygen input conduit 118. The air humidifier 128 hydrates air flowing through it by exposing the input air to a water vapor rich environment created therein. Accordingly, the air pump 126 delivers hydrated air to the fuel cell element 110 at a pressure and flow volume suitable for continuous power generation. Moreover, the air pump 126 may include a regulating device, not shown, for adjusting the flow volume and or pressure of the input air as may be required to adjust the power generation.

The cooling loop 112 pumps a liquid coolant through the fuel cell element 110 to remove excess thermal energy therefrom. The cooling loop 112 includes a cooling pump 132 for drawing cooling fluid in through a conduit 134 and expelling cooling fluid out through a conduit 136. The conduit 136 forces cooling fluid through the fuel cell element 110, which is configured with a cooling fluid flow path. Cooling fluid flows out of the fuel cell element 110 through a conduit 138. The cooling fluid is cycled through a heat exchanger 140, where thermal energy is removed from the cooling fluid, and back to the cooling pump 132. The heat exchanger 140 may comprise a liquid to air radiator configured to air cool the cooling fluid as it flows through the heat exchanger 140. Alternately, the fuel cell element 110 may be cooled by another suitable cooling apparatus.

In a preferred embodiment, the fuel cell element 110 comprises a fuel cell stack formed by a plurality of membrane electrode assemblies (MEA's) stacked one above another and separated by electrically conductive plates. The MEA's are configured with end manifolds for establishing separate flow paths for each reactant and for the coolant. Generally, oxygen and hydrogen flow over opposing membrane electrode surfaces.

Figure 2:
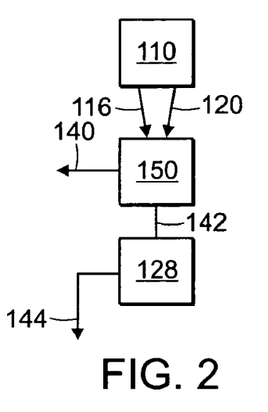
FIG. 2 depicts a schematic representation of a fuel cell system having a single device for separating liquid droplets from a fluid flow comprising multiple outflows from a fuel cell according to one aspect of the present invention.

Turning now to FIGS. 2-5 four different embodiments for handling outflow from a fuel cell element 110 according to the present invention are shown schematically. As shown in FIG. 2, a first embodiment for disposing of outflow from the fuel cell element 110 depicts the hydrogen outflow line 116 and the oxygen outflow line 120 each exiting from the fuel cell element 110 and delivering the entire fuel cell element outflow into a liquid recovery device 150. In the example of a PEM fuel cell element 110 each of the hydrogen and air outflow conduits 116 and 120 carries a reaction byproduct comprising liquid water and water vapor. As will be described below, the liquid recovery device 150 recovers liquid water from the outflow and the gaseous content of the outflow passes through the liquid recovery device. The liquid recovered from the outflow is delivered out of the liquid recovery device 150 through a liquid outflow conduit 140. The outflow conduit 140 may deliver the liquid to the fuel supply element 102, to another area of the fuel cell system 100, or the liquid may be delivered out of the fuel cell system 100. A further shown in FIG. 2, a second conduit 142 delivers the gaseous outflow out from the liquid recovery device 150 to the air humidifier 128. The gaseous outflow delivered out from the liquid recovery device 150 by the conduit 142 may still contain a vapor component, e.g. water vapor, and the water vapor is usable to humidify incoming air in the air humidifier 128. A gas exhaust conduit 144 delivers the remaining gaseous outflow content out of the air humidifier 128 after the vapor content of the outflow gas has been used to humidify the incoming air. The exhaust conduit 144 may exhaust the remaining gaseous outflow to the surrounding environment or to another suitable area as may be required.

Figure 3:
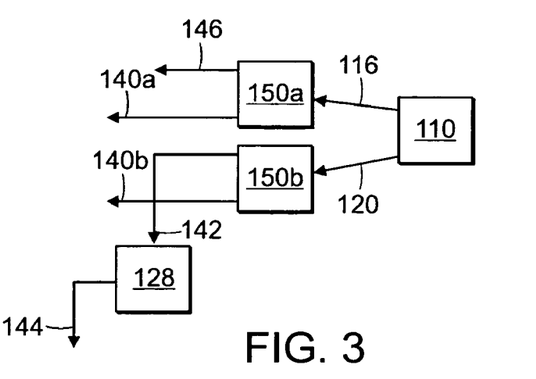
FIG. 3 depicts a schematic representation of a fuel cell system having a plurality of devices for separating liquid droplets from each of a plurality of fluid outflows from a fuel cell according to another aspect of the present invention.

FIG. 3 depicts a second embodiment for disposing of outflow from the fuel cell element 110. As shown in FIG. 3, a first liquid recovery device 150a is disposed in the hydrogen outflow conduit 116 and a second liquid recovery device 150b is disposed in the oxygen outflow conduit 120. In this embodiment the first liquid recovery device 150a separates and recovers liquid from the hydrogen outflow and delivers the recovered liquid out from the first liquid recovery device 150a via a first liquid outflow conduit 140a. Similarly the second liquid recovery device 150b separates and recovers liquid from the oxygen outflow and delivers the recovered liquid out from the second liquid recovery device 150b via a second liquid outflow conduit 140b. Each liquid outflow conduit 140a and 140b may deliver the liquid to the fuel supply element 102, to another area of the fuel cell system 100, or the liquid may be delivered out of the fuel cell system 100. In the second embodiment of FIG. 3, gaseous hydrogen exits the liquid recovery device 150a via a hydrogen outflow conduit 146. The conduit 146 may be routed back to the hydrogen input conduit 114 so that unused hydrogen may be reused as hydrogen fuel. As in the first embodiment, gaseous oxygen or air exits the second liquid recovery device 150b via an outflow conduit 142. The outflow conduit 142 is routed to the air humidifier 128 and the gaseous oxygen outflow is used to hydrate incoming air in the air humidifier 128. The gaseous oxygen or air is then exhausted from the air humidifier by the conduit 144.

Figure 4:
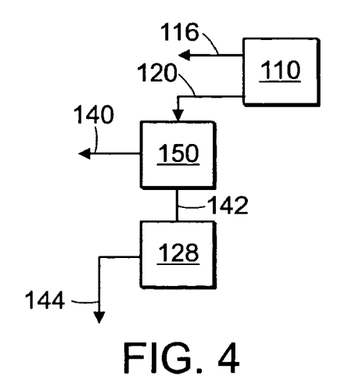
FIG. 4 depicts a schematic representation of a fuel cell system having a device for separating liquid droplets from only one of a plurality of outflows from a fuel cell according to another aspect of the present invention.

FIG. 4 depicts a third embodiment for disposing of outflow from the fuel cell element 110. As shown, a liquid recovery device 150 is disposed in the oxygen outflow conduit 120 and the hydrogen outflow conduit 116 is not associated with any liquid recovery device. In this embodiment, gaseous hydrogen exiting the fuel cell element 110 via the hydrogen outflow conduit 116 may be reused as hydrogen fuel or for another purpose without any liquid being recovered therefrom. In the third embodiment of FIG. 4, the oxygen or air outflow conduit 120 delivers oxygen outflow directly to the liquid recovery device 150 which separates and removes any liquid content therefrom. The separated liquid is delivered out of the liquid recovery device 150 via the liquid outflow conduit 140 and may be delivered to the fuel supply element 102, to another area of the fuel cell system 100, or the liquid may be delivered out of the fuel cell system 100. As in the first embodiment, gaseous oxygen or air exits the second liquid recovery device 150 via an outflow conduit 142 and is used to hydrate incoming air in the air humidifier 128. The gaseous oxygen or air is then exhausted from the air humidifier by the conduit 144.

Figure 5:
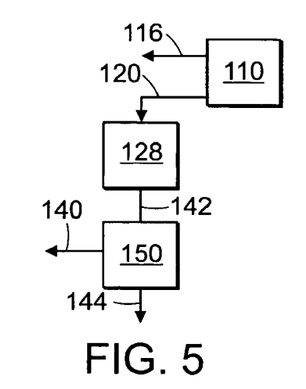
FIG. 5 depicts a schematic representation of a fuel cell system having a device for separating liquid droplets from fluid flow received from an air humidifier receiving outflow from a fuel cell according to another aspect of the present invention.

FIG. 5 depicts a fourth embodiment for disposing of outflow from the fuel cell element 110. In the fourth embodiment the fuel cell hydrogen outflow conduit 116 is not associated with any liquid recovery device. As shown, the fuel cell oxygen or air outflow conduit 120 delivers fuel cell oxygen outflow directly into the air humidifier 128. The air humidifier 128 mixes the liquid and vapor rich oxygen outflow with incoming air to humidify the incoming air before any liquid content is removed from the oxygen outflow. Thereafter, the oxygen outflow exits from the air humidifier 128 via an outflow conduit 142. The conduit 142 inputs the oxygen outflow into the liquid recovery device 150, which separates the liquid content from the gaseous oxygen outflow. The separated liquid is delivered out of the liquid recovery device 150 via the liquid outflow conduit 140 and may be delivered to the fuel supply element 102, to another area of the fuel cell system 100, or the liquid may be delivered out of the fuel cell system 100. The remaining gaseous oxygen or air exits the liquid recovery device 150 via an outflow conduit 144 and is exhausted out of the system.

Generally, according to the present invention, a fuel cell system 100 may be configured with one or more liquid recovery devices 150 to separate and recover liquid from a fluid flow stream that includes liquid droplets entrained therein, and the liquid recovered by the recovery device 150 may be collected and delivered to an area of the fuel cell for a useful purpose, or the recovered liquid may be stored within the fuel cell system or delivered out of the fuel cell system as may be required.

Figure 6:
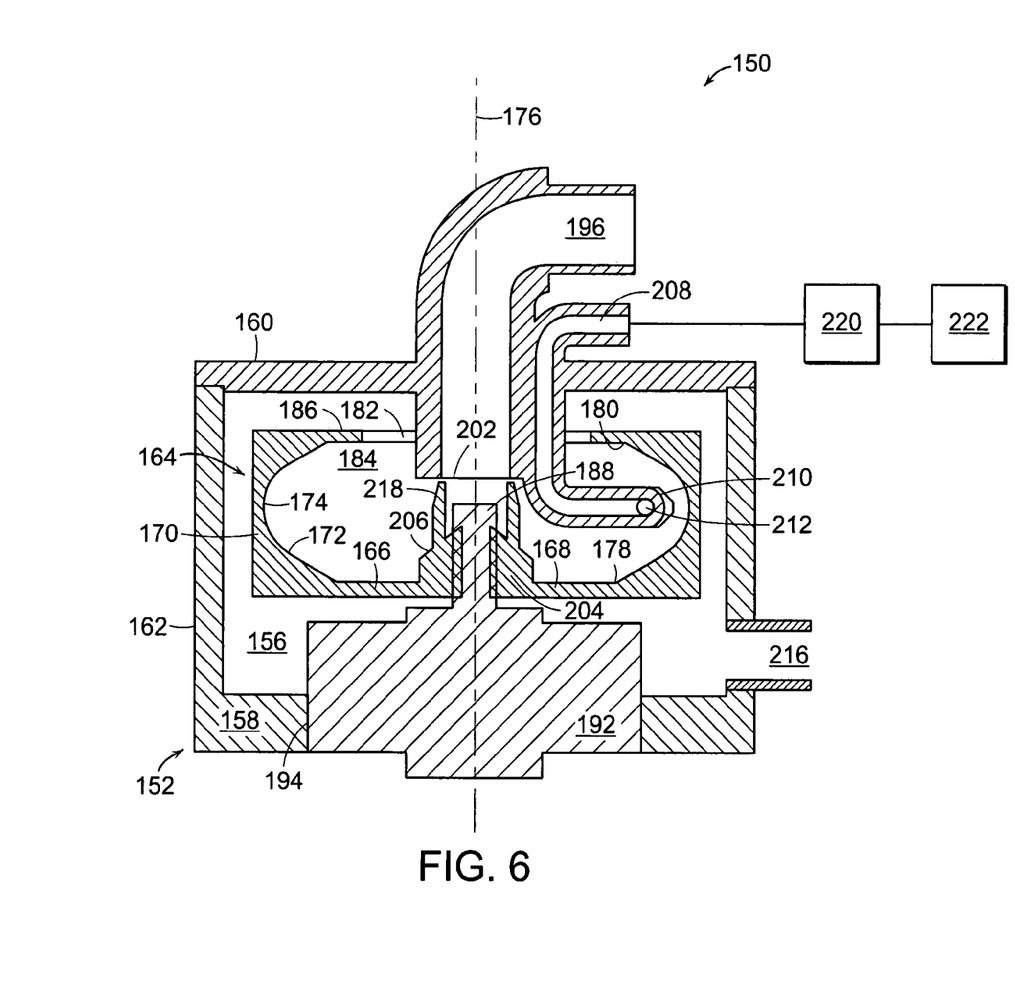
FIG. 6 depicts a section view taken through a rotation axis of a preferred embodiment of a device for separating liquid droplets from a fluid flow according to the present invention.

Turning now to FIG. 6 a first embodiment of a liquid recovery device 150, according to the present invention, is shown in section view. The device 150 includes a fixed base element 152. The fixed base element 152 is fixedly attached to a frame or housing member, not shown, of the fuel cell system 100. The fixed base element 152 may comprise wall members configured to enclose a hollow volume 156. In one example, the wall members comprise a disk-shaped base wall 158, an opposing disk-shaped top wall 160, and an annular side wall 162 extending between the base wall 158 and top wall 160. In the example embodiment, the base wall 158 and the top wall 160 are circular in cross-section and each has an inside surface facing the hollow volume 156 and an outside surface substantially opposed to the inside surface. The perimeter wall 162 includes a generally cylindrical outside surface with an outside diameter and a generally cylindrical inside surface having an inside diameter, facing the hollow volume 156, such that the hollow volume 156 is generally cylindrical. However, other size and shape configurations for the hollow volume 156 or for the wall members are usable without deviating from the present invention.

Figure 9A:
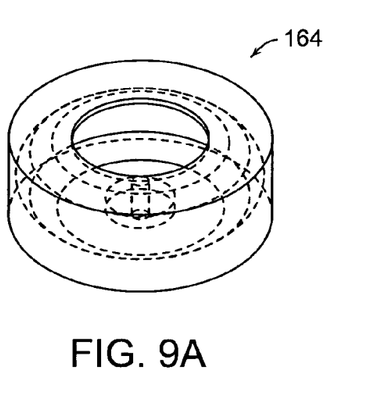
FIG. 9A depicts a phantom isometric view of a first embodiment of a rotatable element according to the present invention.
Figure 9B:
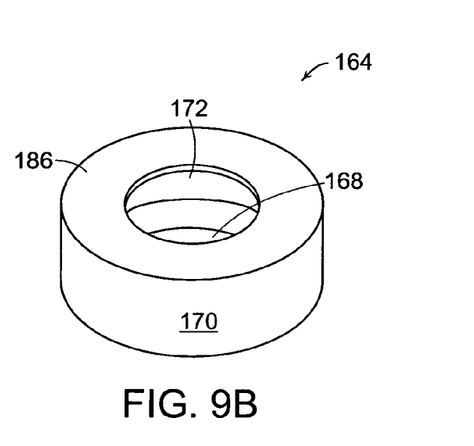
FIG. 9B depicts a solid isometric view of a first embodiment of a rotatable element according to the present invention.

The liquid recovery device 150 further includes a rotating element 164, shown in isometric views in FIGS. 9A and 9B, disposed inside the hollow volume 156 and supported for rotation with respect to the base element 152. The rotating element 164 generally comprises a cup-shaped container having a partially enclosed fluid volume 184 surrounded by wall members. The wall members include a circular base wall 166 having an inside surface 168 and an opposing outside surface. An annular perimeter wall 170 is formed by a generally cylindrical outside surface having an outside diameter and an inside surface 172. The inside surface 172 includes a maximum inside diameter 174 and is contoured with reduced inside diameter dimensions at other locations of the inside surface 172. The circular base wall 166 includes an axial center 176 that defines a rotation axis of the rotating element 164. The base wall 166 includes a lower perimeter edge 178 which meets with the annular perimeter wall 170. The base wall 166 and the perimeter wall 170 may be integrally formed or otherwise fastened together to provide a smooth fluid communication to allow liquid droplets to move easily from the base wall inside surface 168 to the perimeter wall inside surface 172. The perimeter wall 170 extends generally orthogonal to the base wall 166 and forms an upper perimeter edge 180 which is circular in cross-section. The upper perimeter edge 180 may define a circular top aperture 182. The top aperture 182 provides access to the partially enclosed fluid volume 184. Alternately, the rotating element 164 may also include a top wall 186 attached to or integrally formed with the perimeter wall 170 at an upper perimeter edge 180 and disposed generally opposed to the base wall 166. The top wall 186 includes the top aperture 182 formed therethrough and may be used to further enclose the partially enclosed fluid volume 184.

The rotating element 164 is supported for rotation about the axial center 176 by a motor shaft 188. The motor shaft 188 has a shaft rotation axis that is oriented coaxial with the axial center 176. The shaft 188 is fixedly attached to the rotating element base wall 166 by any attaching means, and may extend through the base wall 166, e.g. using a press fit or adhesive bond. The motor shaft 188 extends from a rotary motor 192, which rotates the motor shaft 188, and the attached rotating element 164, in response to an electrical current signal delivered to the motor 192. The motor 192 is fixedly attached to the base element 152, e.g. by extending through a motor mounting aperture 194 passing through the base wall 158, e.g. using a press fit or adhesive bond. Accordingly, rotation of the motor shaft 188 rotates the rotating element 164 and generates a centrifugal force for causing liquid disposed on the inside surfaces of the partially enclosed fluid volume 184 to flow radially away from the rotation axis or axial center 176 toward the perimeter wall inside surface 172 and particularly toward the inside surface maximum diameter 174.

Figure 7A:
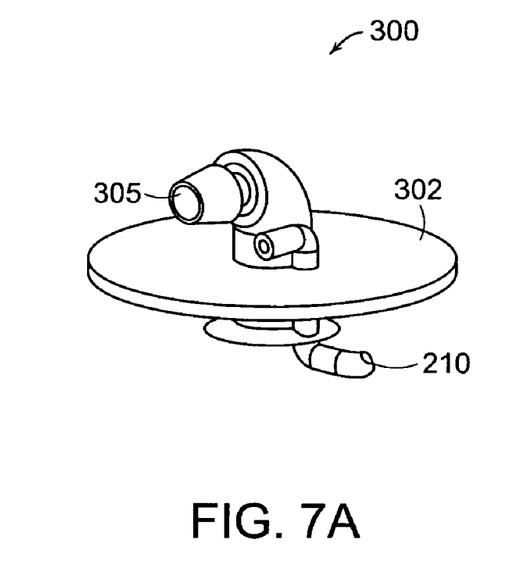
FIG. 7A depicts and isometric view of an enclosure top wall assembly according to one embodiment of the present invention.
Figure 7B:
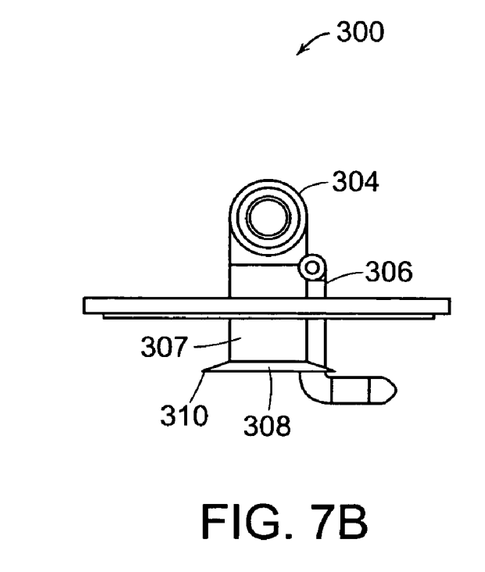
FIG. 7B depicts a front view of an enclosure top wall assembly shown in FIG. 7A.

The base element top wall 160 is configured to be removable from the base element annular side wall 162 to provide access to the hollow volume 156. A first or input fluid conduit 196 comprises any one of the outflow lines from the fuel cell element 110 or from the air humidifier 128 and generally carries a fluid flow into the hollow volume 156. The fluid flow comprises a gaseous flow having liquid droplets entrained therein. The first fluid conduit 196 extends through an access port in the top wall 160 or may be formed integral with the top wall 160, as shown in FIGS. 7A and 7B, and delivers the fluid flow into the hollow volume 156. The first fluid conduit 192 may comprise any conduit suitable for carrying the fluid flow and is connected at an opposite end to a fluid flow source. The first conduit 196 includes an exit aperture 202 disposed inside the hollow volume 156 for delivering the fluid flow into the hollow volume 156. In a preferred embodiment, the exit aperture 202 is substantially circular in cross-section with its axial center being oriented coaxial with the rotating element axial center 176. Accordingly, the fluid flow exiting from the exit aperture 202 is directed substantially orthogonal with an inside surface 168 of the rotating element base wall 166 and the axial center of the fluid flow is directed coaxial with the rotating element axial center 176.

As further shown in FIG. 6, the base wall 166 may include and axial hub 204 surrounding the axial center 176. The axial hub 204 receives the motor shaft 188 therethrough and is formed with a 45 degree sloped surface 206 facing radially away from the axial center 176 for directing fluid flow impinging onto the sloped surface 206 radially outward toward the perimeter wall 170. The fluid flow stream enters the hollow volume 156 with an entering fluid pressure and fluid flow volume flow rate and immediately expands to fill the hollow volume 156. As the fluid flow stream impinges the axial hub 204, fluid is redirected radially outward over a 360° angle. Moreover as the fluid flow impinges upon inside surfaces of the partially enclosed volume 184, some of the liquid droplets entrained within the fluid flow are deposited thereon. Centrifugal force generated by rotation of the rotating element 164 causes any liquid droplets deposited onto the inside surfaces of the partially enclosed volume 184 to be forced radially outward to the perimeter wall inside surface 172 and particularly to the maximum inside diameter 174. In the example shown in FIG. 6, the inside surface 172 is contoured with a v-shaped contour with the maximum inside diameter 174 being located substantially midway between the lower perimeter edge 178 and the upper perimeter edge 180. In this configuration, liquid forced radially outward collects in the maximum inside diameter 174 and begins to fill the v-shaped cross-section and is held in the v-shaped cross-section by the centrifugal force of rotation. Of course the inside surface 172 can be formed with other contours shaped to hold liquid as the element 164 rotates.

A second fluid conduit 208 extends through an access port in the top wall 160, or is formed integral with the top wall, as shown in FIGS. 7A and 7B, and is provided for removing liquid from the partially enclosed volume 184. The second or liquid outflow fluid conduit 208 has collection end 210 that includes a collection aperture 212 formed therethrough. The collection end 210 is formed to position the collection aperture 212 proximate to the maximum inside diameter 174 and to direct the collection aperture 212 substantially opposed to the direction of tangential velocity of liquid collected in the v-shaped contour such that a fluid head pressure is developed to force liquid from the v-shaped contour through the collection aperture 212 and along the liquid outflow fluid conduit 208. The second fluid conduit 208 may comprise any of the liquid outflow conduits exiting from the liquid recovery device 150 shown in FIGS. 2-5 and generally delivers liquid out of the liquid recovery device 150 to a desired location. The second fluid conduit 208 may comprise any closed fluid conduit suitable for carrying a volume of liquid. During operation, the rotating element 164 is rotated about the rotation axis 176 with an angular velocity by the motor 192. A fluid stream entering the partially enclosed volume 184 deposits liquid droplets onto the inside surfaces 168 and 172 and the centrifugal force generated by rotation causes the liquid droplets deposited on the surfaces to migrate into the v-shaped cross-section and to be held therein by centrifugal force. The liquid in the v-shaped cross-section rotates with a tangential velocity proportional to the rotation element angular velocity and its radial distance from the rotation axis. The collection aperture 212 is fixed in position and faces the direction of the liquid tangential velocity such that the rotating liquid is forced into the collection aperture 212. As the v-shaped cross-section fills with liquid, the collection aperture 212 becomes partially or fully submerged in the liquid and liquid begins to fill the second conduit 208. When the liquid tangential velocity is sufficiently high, liquid is forced through the collection aperture 212 and along the second conduit 208 with a head pressure developed by the liquid tangential velocity against the collection aperture 212. In a preferred embodiment, the inside diameter of the conduit 208 and the collection aperture 212 each have a circular diameter of approximately 0.8 mm, the maximum inside diameter 174 is approximately 18 mm and the rotating element is rotated with an angular velocity in the range of 7000-8000 revolutions per minute, (RPM). This generates a head pressure in the conduit 208 of approximately 2-3 pounds per square inch, (PSI) and causes liquid to flow through the conduit 208. In other embodiments, the flow conduit 208 may be formed with a smaller circular cross-section, e.g. 0.4 mm, configured to wick liquid out of the v-shaped cross-section by a capillary action. Alternately, the output conduit 208 may be fluidly connected with a pumping device 220, which is configured to draw liquid into the collection aperture 212 and to pump liquid contained within the conduit 208 to a liquid reservoir 222.

As further shown in FIG. 6, a gas exit conduit 216 extends through an access port in the peripheral wall 162, or is formed integral with the peripheral wall 162, and is provided for removing gases from the enclosed volume 156. The gas exit conduit 216 may pass through any of the walls of the base element 152 and may comprise any of the gas outflow conduits shown exiting from the liquid recovery device 150 in FIGS. 2-5 and generally delivers gaseous outflow out from the liquid recovery device 150. The gaseous outflow may still include vapor, some liquid droplets and solid particles entrained therein and is therefore usable to hydrate incoming air in the air humidifier 128. Alternately, the gas exit conduit 216 may be used to exhaust the gaseous outflow to the local environment.

A further element of the rotating element 164 comprises one or more fingers 218 extending upward from the axial hub 204 toward the first fluid conduit 196 near its exit aperture 202 and proximate to internal and external surfaces of the exit aperture area. The fingers 218 rotate with respect to the first fluid conduit 196 and serve to impact liquid droplets formed on surfaces of the first fluid conduit 196 and remove liquid droplets therefrom.

An integrated top wall assembly 300 for matting with the enclosure annular side wall 162 is shown in isometric and front views in FIGS. 7A and 7B. The integrated top wall assembly 300 includes a disk shaped top wall 302 with a first fluid conduit 304 and a second fluid conduit 306 extending above and below the top wall 302. The first fluid conduit 304 includes an external end 305 formed as a hose fitting for interfacing with conventional hose or flexible tubing. The first fluid conduit 304 includes an internal end 307 that includes an exit aperture, not shown, surrounded by a tapered annular lip 308. The tapered lip 308 tapers to a shape edge 310. The taper causes liquid droplets accumulating thereon to migrate toward the sharp edge 310. A droplet reaching the sharp edge 310 falls off the sharp edge and is distributed into the partially enclosed volume 184. The tapered lip 308 and sharp edge 310 are usable instead of the fingers 218, described above, or in addition to the fingers 218 for distributing liquid droplets accumulated on the inside end 307 into the surrounding chamber.

Thus according to one embodiment of the present invention a fluid flow stream having liquid droplets entrained therein may be directed into the liquid recovery device 150, described above, and the liquid recovery device employs a cup-shaped rotating element 164 to collect liquid droplets on its inside surfaces, e.g. 168 and 172. Meanwhile, the rotating element generates a centrifugal force that cause the liquid droplets to flow toward the maximum diameter 174 and to fill the v-shaped contour of the inside surface 172 where a second fluid conduit 208 is positioned to collect the liquid collected within the v-shaped contour through a collection aperture 212 directed opposed the liquid tangential velocity vector. The liquid is then removed from the liquid recovery device 150 through the second fluid conduit 208. The remaining gaseous outflow from the liquid recovery device 150 exits through an exit conduit 216. The liquid recovery device 150 is usable in any orientation. In particular, there is no need to align an axis of the device 150 with the direction of local gravitational forces for the liquid to be separated from the fluid flow and collected.

Figure 8:
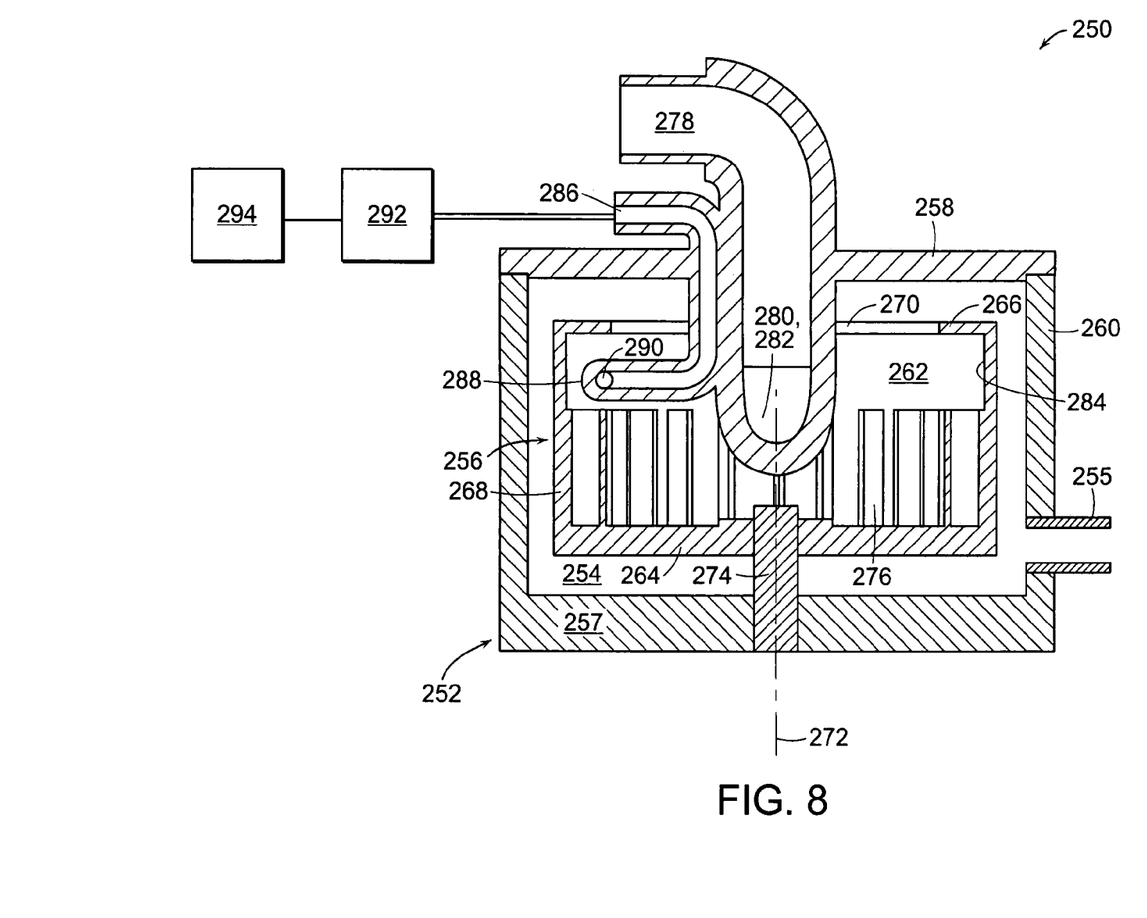
FIG. 8 depicts a section view taken through a rotation axis of an alternate embodiment of a device for separating liquid droplets from a fluid flow according to the present invention.

In a further embodiment of the present invention, a liquid recovery device 250 is shown in FIG. 8, which depicts a section view taken through a rotation axis 272 of the device 250. The liquid recovery device 250 includes a fixed base element 252 attached to a frame or housing member, not shown, and the base element 252 comprising wall members configured to enclose a hollow volume 254. The wall members comprise a disk-shaped base wall 257, an opposing disk-shaped top wall 258, and an annular side wall 260 extending between the base wall 257 and top wall 258. In the example embodiment, the base wall 257 and the top wall 258 are circular in cross-section and the perimeter wall 260 includes a generally cylindrical outside surface with an outside diameter and a generally cylindrical inside surface having an inside diameter that faces the hollow volume 254. The hollow volume 254 is generally cylindrical and includes a first fluid inflow conduit 278, a second liquid outflow conduit 286 and a gas outflow conduit 255. As shown in FIG. 8, the fluid inflow conduit 278 and liquid outflow conduit 286 pass through the top wall 258. In addition, the top wall 258 is removable from the annular perimeter wall 260 to provide access into the hollow volume 254. Generally a fluid stream enters the device 250 through the inflow conduit 278. Liquid is separated from the fluid stream by a rotating element 256 and the liquid exits from the device 250 via the liquid outflow conduit 286. The remaining gaseous content of the fluid stream exits from the device 250 via the gas outflow conduit 255.

Figure 10A:
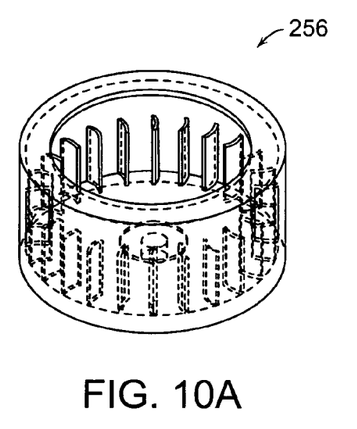
FIG. 10A depicts a phantom isometric view of a second embodiment of a rotatable element according to the present invention.
Figure 10B:
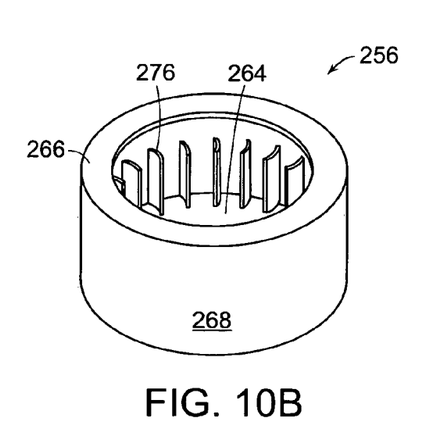
FIG. 10B depicts a solid isometric view of a second embodiment of a rotatable element according to the present invention.

The liquid recovery device 250 further includes a rotating element 256, shown in isometric view in FIGS. 10A and 10B, disposed inside the hollow volume 254 and supported for rotation with respect to the base element 252. The rotating element 256 generally comprises a cup-shaped container having a partially enclosed fluid volume 262 surrounded by wall members. The wall members include a generally circular base wall 264, a generally circular opposing top wall 266 and an annular perimeter wall 268 extending between the base wall and the top wall. A top aperture 270 passes through the top wall 266 and provides access into the partially enclosed fluid volume 262. The circular base wall 264 includes an axial center 272 that defines a rotation axis of the rotating element 256. A cylindrical support shaft 274 is fixedly attached to the fixed base wall 257 and extends into the hollow volume 254 and through the rotating element base wall 264 for rotatably support the rotating element 256 thereon. The interface between the support shaft 274 and the rotating element 256 allows free rotation of the rotating element 256 with respect to the fixed base element 252. The support shaft 274 includes a capturing means, not shown, to capture the rotating element on the shaft 274 for limiting non-rotational motion of the rotating element 265. Accordingly, the rotating element is free to rotate about the axial center 272.

The inside of the rotating element 256 is divided into a lower portion and an upper portion with the lower portion being configured with a plurality of impeller blades 276, each integrally formed with the peripheral wall 268 and the base wall 264. Each impeller blade 276 comprises a blade element having a longitudinal length that extends from the base wall 264 to one half to three quarters of the height of the perimeter wall 268 and has a radial dimension that extends from the perimeter wall 268 to one quarter to one half of an inside radius of the peripheral wall 286. In this embodiment, a first input conduit 278 delivers a stream of fluid flow into the hollow volume 254 through the top wall 258 and is formed with an exit end 280 and an exit aperture 282 disposed to direct the incoming fluid flow tangentially onto the impeller blades 276. The fluid flow being delivered out of the exit aperture 282 impinges onto a single impeller blade 276 that is positioned opposed to the exit aperture 282 and the force of the fluid flow stream acting on the single impeller blade 276 positioned opposed to the exit aperture 282 generates a tangential force that acts on the rotating element and causes the rotating element 256 to rotate about the rotation axis 272. Initial rotation of the rotating element positions an adjacent impeller blade 276 opposed to the exit aperture 282 and the incoming fluid flow acting on the adjacent impeller blade adds to the tangential force acting to rotate the rotatable element and subsequent adjacent impeller blades moved into the fluid flow generate a steady tangential force acting on the rotating element. In addition, liquid droplets entrained in the fluid flow that impinges onto the impeller blades are deposited onto inside surfaces of the partially enclosed volume 262, including onto the impeller blades 276. Rotation of the rotating element 256 generates a centrifugal force that causes liquid droplets on inside surfaces of the volume 262 to collect on an inside surface 284 of the peripheral wall 268. In continued operation, a layer of liquid is held against the inside surface 284 and accumulates with a liquid layer thickness.

A second liquid outflow fluid conduit 286 extends through the top wall 258, and into the partially enclosed volume 262 through the aperture 270 to remove liquid therefrom. The second fluid conduit 286 has a collection end 288 that is formed to position the collection end 288 proximate to the inside surface 284 at its top portion, above the height of the impeller blades 276, and the collection end 288 includes a collection aperture 290 formed therethrough. According to the invention, the collection end 288 is formed to direct the collection aperture 290 into or opposed to the direction of a tangential velocity vector of the liquid layer held against the inside surface 284 by centrifugal force. During operation, liquid collects along the entire longitudinal length of the inside surface 284 and is held against the inside surface 284 by centrifugal force. As the thickness of the liquid layer held against the inside surface 284 increases, the collection aperture 290 becomes partially or fully submerged in the liquid. When the liquid tangential velocity is sufficiently high, liquid is forced through the collection aperture 290 and to flow along the liquid outflow conduit 286 by a head pressure developed by the liquid tangential velocity against the collection aperture 290.

In a preferred embodiment, the inside diameter of the conduit 288 and the collection aperture 290 each have a circular diameter of approximately 0.8 mm, the surface 284 has an inside diameter of approximately 18 mm and the rotating element is rotated with an angular velocity in the range of 7000-8000 revolutions per minute, (RPM). In this configuration, a head pressure of 2-3 pounds per square inch, (PSI) is generated by the force of liquid flowing into the collection aperture 290 may be used to force liquid to flow through the conduit 288 and out of the liquid recovery device 250. In other embodiments, the flow conduit 288 may be formed with a smaller circular cross-section, e.g. 0.4 mm, configured to wick liquid out of the partially enclosed fluid volume 254 by a capillary action. Alternately, the output conduit 288 may be fluidly inter-connected with a pumping device 292, which is configured to draw liquid into the collection aperture 290 and to pump liquid contained within the conduit 288 to a desired liquid reservoir 294.

Thus according to a second embodiment of the present invention a fluid flow stream having liquid droplets entrained therein may be directed into the liquid recovery device 250, described above, and the liquid recovery device employs a cup-shaped rotating element 256 having a partially enclosed fluid volume 262 to collect liquid droplets on its inside surfaces. The rotating element 256 is formed with impeller blades 276 inside the partially enclosed fluid volume 262 and is supported to rotate with respect to a fixed base 252. A fluid flow containing liquid droplets is directed to impinge on the impeller blades 276 at an incident angle that causes the rotating element to rotate about a rotation axis 272 under the force of the incoming fluid flow and further causes the liquid droplets to be deposited onto inside surfaces of the partially enclosed volume 262. In response to the rotation of the rotating element 256 a centrifugal force is generated that causes the liquid droplets to flow toward and to collect in a liquid layer on the inside surface 284. A second fluid outflow conduit 286 is positioned to collect liquid from the liquid layer through a collection aperture 290, which is directed opposed to the tangential velocity vector of the liquid layer. The liquid is removed from the liquid recovery device 250 through the second fluid conduit 286. The remaining gaseous outflow from the liquid recovery device 150 exits through an exit conduit 255. The liquid recovery device 250 is usable in any orientation.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications, e.g. for separating liquid droplets from the outflow of a fuel cell, those skilled in the art will recognize that its usefulness is not limited thereto and that the present invention can be beneficially utilized in any number of environments and implementations including but not limited to removing liquid droplets from any fluid flow stream having liquid droplets entrained therein. Accordingly, the claims set forth below should be construed in view of the full breadth and spirit of the invention as disclosed herein.

The invention claimed is:

1. A device for recovering liquid droplets from a fluid flow stream containing liquid droplets entrained therein comprising;
a rotatable element comprising wall elements configured to partially enclose a fluid volume with an annular perimeter wall that includes an inside surface radially offset from and facing an axial center;
a fixed base wall configured to support the rotatable element for rotation with respect to the fixed base wall and about the axial center;
an input fluid conduit including an exit aperture disposed to deliver the fluid flow stream into the fluid volume;
means for rotating the rotatable element about the axial center for generating a centrifugal force capable of moving liquid droplets to the inside surface and forming a layer of liquid held by the centrifugal force against the inside surface; and,
an output liquid conduit including a collection aperture disposed to collect liquid from the layer of liquid, wherein the layer of liquid rotates with the inside surface with a tangential velocity vector and the collection aperture is fixed in position opposed to the tangential velocity vector such that liquid in the layer of liquid enters the collection aperture.

2. A device according to claim 1 wherein the means for rotating the rotatable element comprises a rotary motor fixedly attached to the fixed base wall with a motor shaft extending from the rotary motor and coupled to the rotatable element for rotating the rotatable element about the axial center in response to rotation of the motor shaft.

3. A device according to claim 1 further comprising a fixed enclosure comprising wall members attached to the fixed base wall and configured to enclose and seal a hollow volume for housing the rotatable element therein, and wherein the input fluid conduit delivers the fluid flow stream into the hollow volume the output liquid conduit delivers liquid collected from the layer of liquid out of the hollow volume and further wherein fluid flow is further delivered out of the hollow volume through a gas exit conduit.

4. A device according to claim 1 further comprising a fuel cell element fluidly connected to the fluid input conduit and wherein the fuel cell element delivers the fluid flow stream into the input conduit.

5. A device according to claim 1 further comprising a pump element fluidly connected to the output liquid conduit for suctioning liquid from the layer of liquid.

6. A device according to claim 1 wherein the inside surface is generally circular and coaxial with the axial center and is formed with a maximum inside diameter for receiving the layer of liquid thereon and further includes reduced inside diameter dimensions on opposing longitudinal sides of the maximum inside diameter.

7. A device according to claim 1 wherein the annular perimeter wall further includes other inside surfaces and the liquid droplets deposited onto said other inside surfaces move to the inside surface.

8. A device according to claim 1 wherein the layer of liquid is forced into the collection aperture with a head pressure.

9. A device according to claim 1 wherein the layer of liquid wicks into the collection aperture by capillary action.

10. A device according to claim 1 wherein the layer of liquid is drawn into the collection aperture.

11. A device according to claim 1 wherein the rotatable element further comprises a circular base wall, centered with respect to the axial center and attached to the annular perimeter wall and wherein the circular base wall includes an inside surface facing into fluid volume and is formed to communicate liquid droplets formed thereon to the inside surface.

12. A device according to claim 11 wherein the rotatable element further comprises a top wall generally opposed to the circular base wall and attached to the annular perimeter wall and wherein the top wall included a top aperture formed therethrough for providing access to the fluid volume.

13. A device according to claim 11 wherein the annular perimeter wall comprises a cylindrical outside wall having a substantially uniform outside diameter disposed coaxial with the axial center and wherein the inside surface has a v-shaped contour having a maximum inside diameter formed coaxial with the axial center.

14. A device according to claim 11 wherein the input fluid conduit exit aperture is oriented to direct the fluid flow stream substantially orthogonally onto the base wall inside surface and substantially coaxial with the axial center.

15. A device according to claim 14 wherein the input fluid conduit further comprises a tapered annular lip tapered to a shape edge.

16. A device according to claim 14 wherein the base wall inside surface is formed with an axial hub portion surrounding the axial center for receiving the fluid flow stream thereon and wherein the axial hub portion includes a surface shaped to direct the fluid flow stream falling thereon radially away from the axial center.

17. A device according to claim 16 wherein said axial hub portion further includes fingers extending axially therefrom for removing liquid droplets from surfaces of the input fluid conduit.

18. A device according to claim 1 wherein the means for rotating the rotatable element comprises: a plurality of impeller blades attached to the inside surface and extending radially inward toward the axial center; wherein the input conduit exit aperture is disposed to direct the incoming fluid flow onto an impeller blade positioned opposed to the exit aperture; and wherein the fluid flow stream impinges on the impeller blade positioned opposed to the exit aperture to generate a tangential force acting on the rotating element for causing the rotating element to rotate about the rotation axis.

19. A device according to claim 18 wherein the perimeter wall has a longitudinal length and wherein the rotatable element further comprises a circular base wall, centered with respect to the axial center and attached to the annular perimeter wall and wherein each of the plurality of impeller blades further attaches to the circular base wall and extends longitudinally from the circular base wall to one half to three quarters of the longitudinal length of the perimeter wall.

20. A device according to claim 19 wherein the rotatable element further comprises a top wall generally opposed to the circular base wall and attached to the annular perimeter wall and wherein the top wall includes a top aperture formed therethrough for providing access to the fluid volume.

21. A device according to claim 20 further comprising a fixed enclosure comprising wall members attached to the fixed base wall and configured to enclose and seal a hollow volume for housing the rotatable element therein, and wherein the input fluid conduit delivers the fluid flow stream into the hollow volume, the output liquid conduit delivers liquid collected from the layer of liquid out of the hollow volume and further wherein fluid flow is further delivered out of the hollow volume through a gas exit conduit.

22. A fuel cell system comprising:
  a fuel cell element configured to react reactants to generate an electrical current and a fluid flow stream flowing out from the fuel cell element, wherein the fluid flow stream comprises a gaseous flow that contains liquid droplets entrained therein;
  a rotatable element having wall elements configured to partially enclose a fluid volume bounded by inside surfaces including an annular perimeter wall inside surface disposed radially offset from and facing an axial center, wherein the annular perimeter wall comprises a cylindrical outside wall having a substantially uniform outside diameter disposed coaxial with the axial center and wherein the inside surface has a v-shaped contour having a maximum inside diameter formed coaxial with the axial center;
  a fixed base wall configured to support the rotatable element for rotation with respect thereto and about the axial center;
  an input fluid conduit extending from the fuel cell to the rotatable element for receiving the fluid flow stream from the fuel cell and delivering the fluid flow out of a fixed exit aperture thereof and into the fluid volume for depositing liquid droplets onto the inside surfaces;
  means for rotating the rotatable element about the axial center for generating a centrifugal force capable of moving the liquid droplets onto the inside surface and forming a layer of liquid thereon; and,
  an output liquid conduit including a collection aperture disposed to collect liquid from the layer of liquid.

23. The fuel cell system of claim 22 wherein the fixed base wall further comprises wall members attached thereto and configured to enclose and seal a hollow volume for housing the rotatable element therein and wherein the input fluid conduit delivers the fluid flow stream into the hollow volume, the output liquid conduit delivers liquid collected from the layer of liquid out of the hollow volume and further wherein fluid flow is further delivered out of the hollow volume through a gas exit conduit.

24. The fuel cell system of claim 22 further comprising an air humidifier in fluid communication with the gas exit conduit for receiving fluid flow therefrom and the air humidifier is further in fluid communication with the fuel cell for delivering humidified air thereto.

25. The fuel cell system of claim 22 further comprising an air humidifier disposed in the input fluid conduit between the fuel cell and the rotatable element to receive the fluid flow stream from the fuel cell element and to remove a portion of the liquid droplets therefrom before the fluid flow stream is delivered to the rotatable element.

26. A device for recovering liquid droplets from a fluid flow stream comprising;
- a rotatable element comprising wall elements configured to partially enclose a fluid volume with an annular perimeter wall that includes an inside surface radially offset from and facing an axial center;
- a fixed base wall configured to support the rotatable element for rotation with respect to the fixed base wall and about the axial center;
- an input fluid conduit including an exit aperture disposed to deliver the fluid flow stream into the fluid volume;
- means for rotating the rotatable element about the axial center for generating a centrifugal force capable of moving liquid droplets to the inside surface and forming a layer of liquid held by the centrifugal force against the inside surface; and
- an output liquid conduit including a collection aperture disposed to collect liquid from the layer of liquid, wherein the input fluid conduit exit aperture is oriented to direct the fluid flow stream substantially orthogonally onto the base wall inside surface and substantially coaxial with the axial center.

27. A device according to claim 26 wherein the base wall inside surface is formed with an axial hub portion surrounding the axial center for receiving the fluid flow stream thereon and wherein the axial hub portion includes a surface shaped to direct the fluid flow stream falling thereon radially away from the axial center and said axial hub portion further includes fingers extending axially therefrom for removing liquid droplets from surfaces of the input fluid conduit.

* * * * *